United States Patent [19]

Tomishima et al.

[11] Patent Number: 5,691,968
[45] Date of Patent: Nov. 25, 1997

[54] OPTICAL DISK UNIT

[75] Inventors: Yuichiro Tomishima, Kojima; Kiyoto Abe, Iwaki, both of Japan

[73] Assignee: Alps Electric Co., Ltd., Tokyo, Japan

[21] Appl. No.: 710,908

[22] Filed: Sep. 24, 1996

Related U.S. Application Data

[63] Continuation of Ser. No. 441,131, May 15, 1995, abandoned.

[30] Foreign Application Priority Data

May 23, 1994 [JP] Japan .................... 6-108606

[51] Int. Cl.$^6$ .................................................. G11B 7/00
[52] U.S. Cl. .................................................. 369/50; 369/32
[58] Field of Search .......................... 369/48, 50, 124, 369/111, 32, 58, 54

[56] References Cited

U.S. PATENT DOCUMENTS

| | | | |
|---|---|---|---|
| 4,675,855 | 6/1987 | Iso et al. | 369/32 |
| 4,789,975 | 12/1988 | Taniyama | 369/50 |
| 4,885,644 | 12/1989 | Ishii et al. | 369/50 |
| 5,444,687 | 8/1995 | Okumura | 369/48 |
| 5,465,244 | 11/1995 | Kobayashi et al. | 369/50 |

*Primary Examiner*—Nabil Hindi
*Attorney, Agent, or Firm*—Guy W. Shoup; Patrick T. Bever

[57] ABSTRACT

An optical disk unit wherein a disk rotating speed is automatically adjusted for reading optical information from various optical disk types, each optical disk type requiring a different rotating speed. The optical disk unit moves an optical head to a track corresponding to a program start position, then moves the optical head to a second track which is a predetermined distance from the first track. The program time information is then read from the second track and compared with preset values. When the program time information is less than a first preset value, the optical disk unit rotates the disk at a slow speed (for example, such that a linear speed of the optical head is 1.2 m/s relative to the disk). When the program time information is less than the first preset value and greater than a second preset value, the optical disk unit rotates the disk at an intermediate speed (for example, 1.3 m/s). Finally, when the program time information is greater than the second preset value, the optical disk unit rotates the disk at a fast speed (for example, 1.4 m/s).

3 Claims, 4 Drawing Sheets

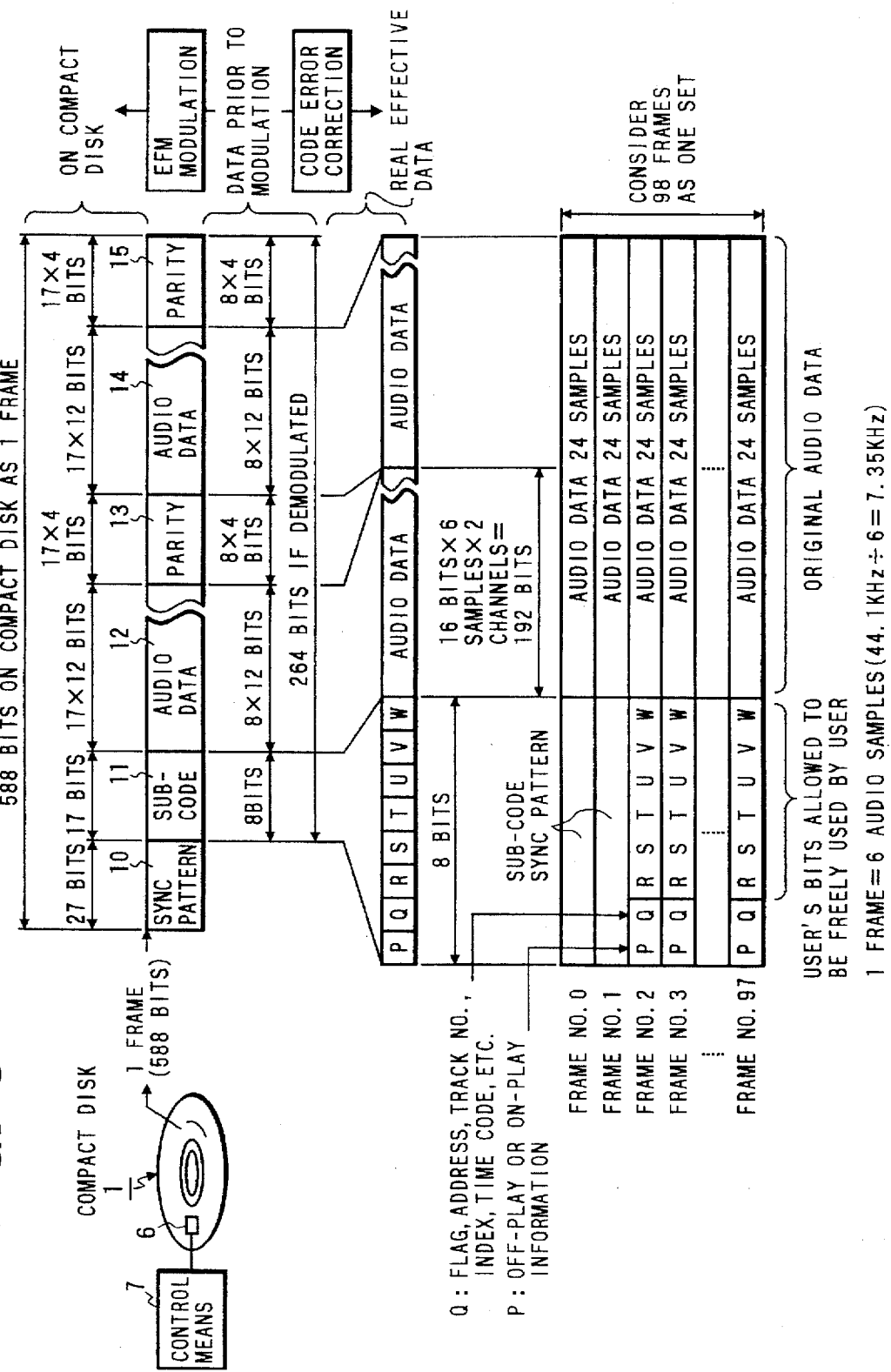

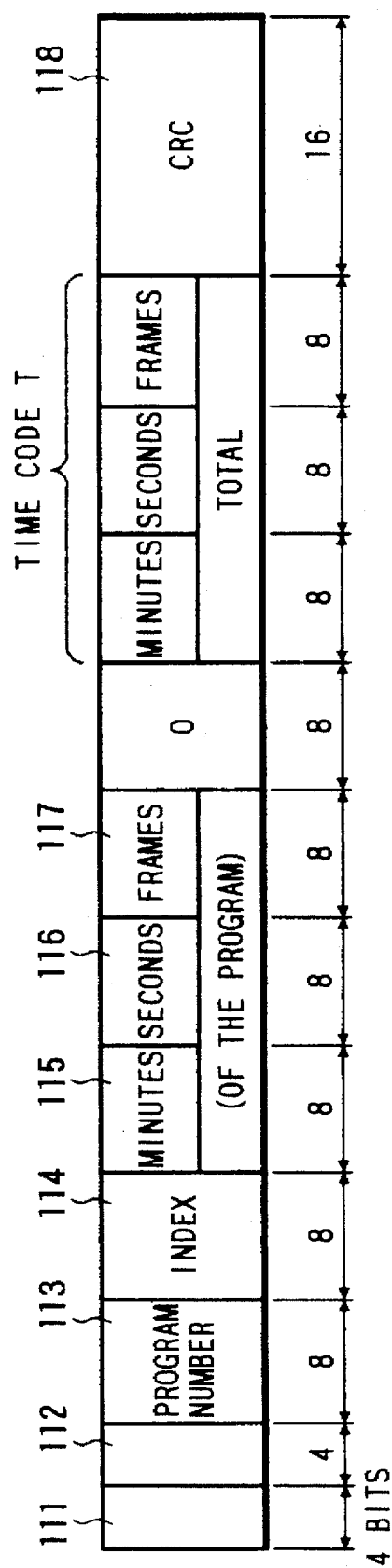

OPTICAL DISK UNIT

This application is a continuation of application Ser. No. 08/441,131, filed May 15, 1995 now abandoned.

BACKGROUND OF THE INVENTION

1. Field of the Invention

The present invention relates to an optical disk unit in which various kinds of disks having different linear velocities can be selectively mounted.

2. Description of the Related Art

An optical disk is required to be rotated at a constant linear velocity by an optical disk unit. The linear velocity varies with the kind of the optical disk to be mounted. General optical disks have different linear velocities ranging from 1.2 m/s to 1.4 m/s.

These disks having the different linear velocities have different numbers of tracks within the absolute radii of the disks. Accordingly, a time period (access time) from the instance an optical head starts to access to the instance the optical head reaches a target track (on-track position) varies with the kind of the disk to be mounted in the optical disk unit.

The operation of a conventional optical disk unit will now be described.

It is assumed that a disk having a specified linear velocity of 1.2 m/s is mounted when power is applied (this disk will be referred to as an assumed disk), and that an optical head is moved to an on-track position corresponding to the 1.2 m/s disk. In this case, a disk having a specified linear velocity of 1.3 m/s is actually mounted (this disk will be referred to as an actually mounted disk).

Accordingly, when sub-code Q information (e.g., an address) at the above on-track position on the 1.3 m/s disk is read as will be hereinafter described, the sub-code Q information in the 1.3 m/s disk is different from sub-code Q information (an address in this case) in the 1.2 m/s disk. From this result, the optical disk unit determines that any disk other than the 1.2 m/s disk is currently mounted.

Then, it is assumed that the 1.3 m/s disk is mounted (this disk is an assumed disk in this case) and that the optical head is moved to the on-track position corresponding to the 1.3 m/s disk. In this case, the sub-code Q information in the assumed disk is identical with the sub-code Q information in the actually mounted disk. Then, the subsequent operation for the 1.3 m/s disk is operated.

Further, in the case where a disk having a specified linear velocity of 1.4 m/s is actually mounted, the above-mentioned on-track operation is further repeated until the assumed disk becomes identical with the actually mounted disk.

Accordingly, in the conventional optical disk unit, unless the linear velocity of the disk currently mounted is preliminarily known, variations in access time in the subsequent operation become large according to the disk currently mounted, causing a lack of reliability.

As another way, it may be considered to calculate an actual linear velocity of the disk currently mounted. However, the equation to be used for the calculation is complex to require much time for processing.

SUMMARY OF THE INVENTION

It is accordingly an object of the present invention to provide an optical disk unit which can simply decide the specified linear velocity of a disk currently mounted to thereby reduce the variations in access time and improve the reliability.

Other objects and features of the invention will be more fully understood from the following detailed description and appended claims when taken with the accompanying drawings

BRIEF DESCRIPTION OF THE DRAWINGS

FIG. 3 is an illustration of the data structure of a CD;

FIG. 4 is an illustration of the structure of a sub-code Q; and

FIG. 5 is an illustration of a control code in the subcode Q.

DETAILED DESCRIPTION OF THE PREFERRED EMBODIMENTS

A preferred embodiment of the present invention will now be described with reference to FIGS. 1 to 5.

First, an optical disk will be described with reference to FIGS. 2 to 4.

Figure 2:
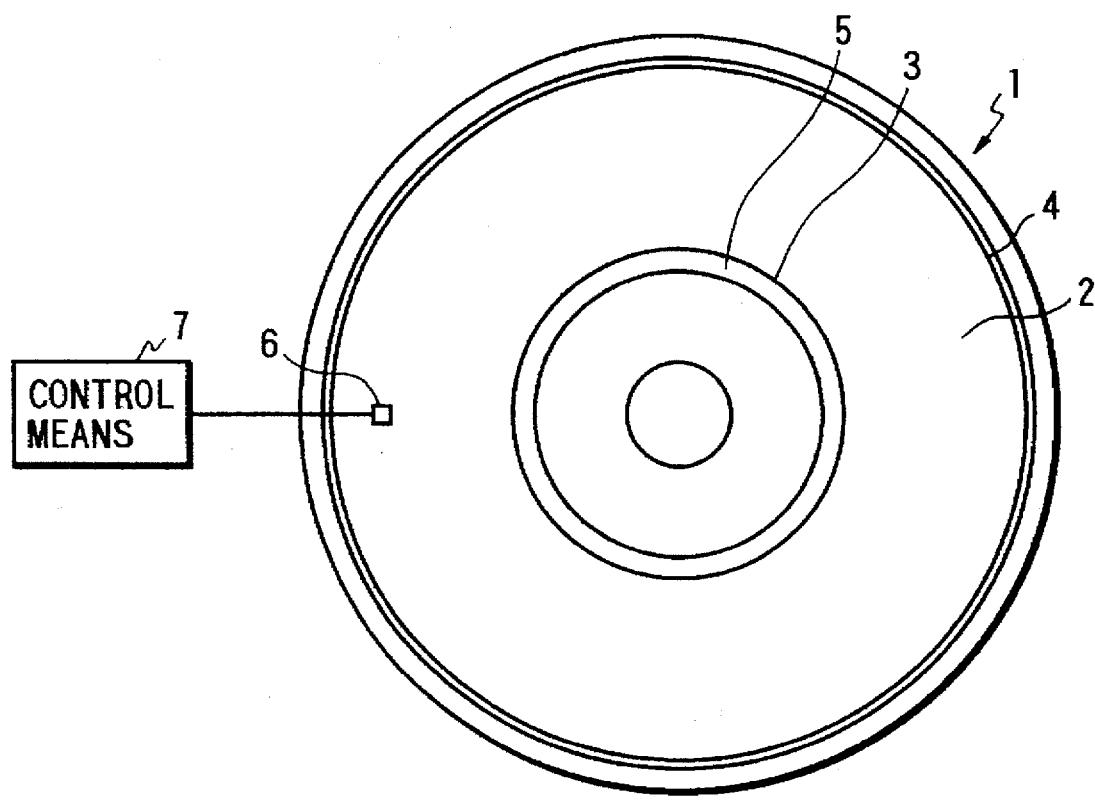
FIG. 2 is a plan view of an optical disk.

Referring to FIG. 2, reference numeral 1 designates an optical disk such as a CD-ROM. The optical disk 1 is formed with a program area 2. The program area 2 includes a lead-in area 3 as a start position (inner circumference) and a lead-out area 4 as an end position (outer circumference). A TOC (Table Of Contents) area 5 in which table-of-contents information is recorded is formed radially inside of the lead-in area 3. The table-of-contents information recorded in the TOC area 5 indicates locations in the program area 2 and kinds of information recorded at these locations.

Next, the data structure of one frame in a CD will be described.

As shown in FIG. 3, there are recorded in one frame a sync pattern (27 bits) 10, sub-code (17 bits) 11, audio data (17×12 bits) 12, bit parity (17×4 bits) 13, audio data (17×12 bits) 14, and bit parity (17×4 bits) 15 sequentially arranged in this order from the start position.

The sub-code 11 consists of eight kinds of sub-codes P to W. The sub-code P indicates off-play or on-play information, and the sub-code Q indicates an address, track number, time code, etc. to be hereinafter described, which is recorded in each of frame Nos. 2 to 97. The sub-codes R to W are called user's bits which are allowed to be freely used by a user.

The detailed structure of the sub-code Q is shown in FIG. 4. As shown in FIG. 4, there are recorded in the sub-code Q a control code (4 bits) 111, address (4 bits) 112, program number (8 bits) 113, index (8 bits) 114, minutes 115, seconds 116, frames 117 (8 bits for each) of the program, time code T, i.e., total minutes, total seconds, and total frames (8 bits for each) of all programs, and CRC (16 bits) 118 sequentially arranged in this order from the start position. The control code 111 is shown in FIG. 5. As shown in FIG. 5, the control code of a CD is defined as 0000, 1000, 0001, and 1001, and the control code of a CD-ROM is defined as 0100.

Accordingly, the location of an optical head 6 corresponding to the number of minutes, seconds, and frames on a certain track can be recognized by reading the sub-code Q.

There is shown in FIG. 2 control means 7 for the optical disk unit of the present invention.

Referring to FIG. 2, the control means 7 constituted of a CPU is provided with start position moving means for moving the optical head 6 to the start position of the program area 2 formed on the disk 1 when power is applied, specified distance moving means for moving the optical head 6 from the start position of the program area 2 by a specified distance, reading means for reading a time code from sub-code Q information including an address, a track number, and the time code at a location defined by the specified distance, and deciding means for deciding a specified linear velocity of the disk 1 currently mounted from the result obtained by the reading means.

The operation of the optical disk unit according to the present invention will now be described with reference to the flowchart shown in FIG. 1.

Figure 1:
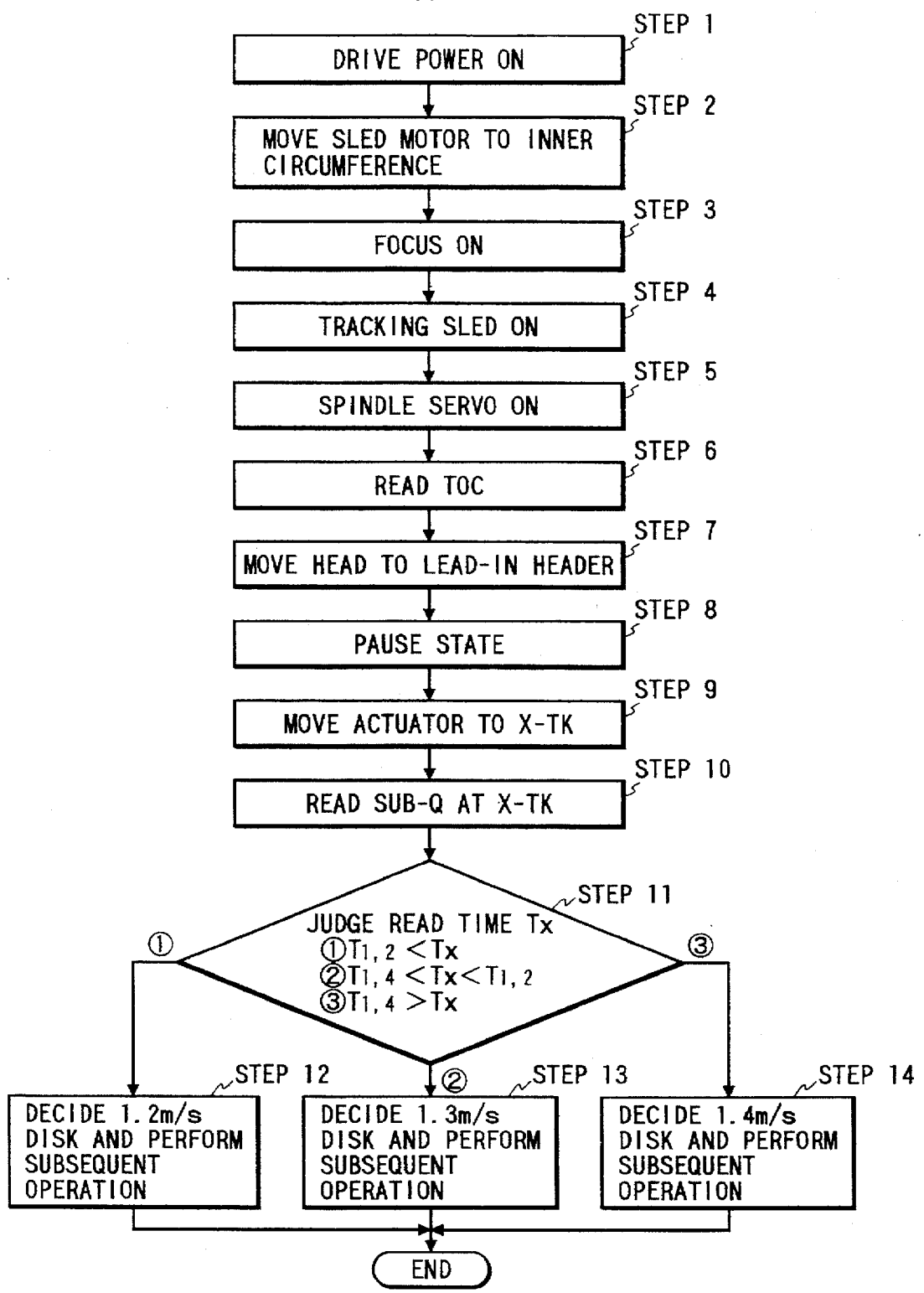
FIG. 1 is a flowchart showing a control flow in the optical disk unit according to the present invention.

Referring to FIG. 1, when power is applied to a drive (optical disk unit) (step 1), a sled motor is driven to move the optical head 6 to the inner circumference of the disk 1 (to the TOC area 5 shown in FIG. 2) (step 2).

Then, a focusing actuator is turned on (step 3), and a tracking actuator is turned on (step 4). Thereafter, a spindle motor is turned on (step 5) to rotate the disk 1 (however, step 5 may precede step 4).

Then, the information (TOC information) recorded in the TOC area 5 is read (step 8), and the optical head 6 is moved to the lead-in area 3 (see FIG. 1) (step 7).

Then, a pause state (where a certain frame/track is repeatedly read) is set (step 8), and the optical head 6 is moved to an X-track (e.g., by a specified distance corresponding to 300 tracks to be hereinafter described) (step 9). Then, the sub-code Q information at the X-track is read (step 10).

Thereafter, the time code (minutes and seconds) Tx in the sub-code Q information read at the X-track is compared with $T_{1.2}$ (the time code at the X-track of a disk having a specified linear velocity of 1.2 m/s) and $T_{1.4}$ (the time code at the X-track of a disk having a specified linear velocity of 1.4 m/s), and the relationship thereamong is judged (step 11).

If $T_{1.2}$ <Tx in the above judgment, it is decided that the disk currently mounted is the disk having the specified linear velocity of 1.2 m/s (①in step 11), and the subsequent operation for this 1.2 m/s disk is performed (step 12). If $T_{1.4}$ <Tx <$T_{1.2}$ in the above judgment, it is decided that the disk currently mounted is a disk having a specified linear velocity of 1.3 m/s (② in step 11), and the subsequent operation for this 1.3 m/s disk is performed (step 13). If $T_{1.4}$ <Tx above judgment, it is decided that the disk currently mounted is the disk having the specified linear velocity of 1.4 m/s (③ in step 11), and the subsequent operation for this 1.4 m/s disk is performed (step 14).

The above judgment will now be more specifically described. For example, the time code $T_{1.3}$ at a 300-track of the 1.3 m/s disk is about 1 min and 21 sec. On the other hand, the time code $T_{1.2}$ at a 300-track of the 1.2 m/s disk is at least 1 min and 50 sec. Further, the time code $T_{1.4}$ at a 300-track of the 1.4 m/s disk is at most 1 min and 10 sec. Accordingly, the specified linear velocity of the disk currently mounted can be preliminarily known by presetting the time codes $T_{1.2}$ and $T_{1.4}$ at the respective X-tracks to proper values, and comparing the time code Tx read at the X-track of the disk currently mounted with the preset values of the time codes $T_{1.2}$ and $T_{1.4}$.

According to this preferred embodiment mentioned above, the deciding means in the control means 7 determines whether the time code read from the sub-code Q information is greater than the two preset values, less than the two preset values, or between the two preset values to thereby decide the specified linear velocity of the disk currently mounted. Further, the deciding means in the control means 7 decides one of 1.2 m/s, 1.3 m/s, and 1.4 m/s as the specified linear velocity of the disk currently mounted. Therefore, the specified linear velocity of the disk currently mounted can be simply decided to thereby provide an optical disk unit less in access time variations and high in reliability.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. An optical disk unit comprising:

start position moving means for moving an optical head to a start position of a program area formed on a disk when power is applied;

specified distance moving means for moving said optical head from said start position of said program area by a specified distance;

reading means for reading a time code from sub-code Q information including an address, a track number, and said time code at a location defined by said specified distance;

deciding means for deciding a specified linear velocity of said disk currently mounted by making only two comparisons between a first preset value, a second preset value and said time code; and means for adjusting a rotating speed of the disk to correspond with the specified linear velocity; wherein:

when said deciding means determines that said time code read from said sub-code Q information is greater than the first preset value, said means for adjusting adjusts the rotating speed to 1.2 m/s, when said deciding means determines that said time code read from said sub-code Q information is less than the second preset value, said means for adjusting adjusts the rotating speed to 1.4 m/s, and when said deciding means determines that said time code read from said sub-code Q information is less than the first preset code and greater than the second preset code, said means for adjusting adjusts the rotating speed to 1.3 m/s; and wherein a value of the first preset code is lower than a value of said second preset code.

2. A method for adjusting a rotating speed of an optical disk mounted in an optical disk unit, the optical disk including a plurality of concentric tracks, each of the plurality of tracks including sub-code Q information including an address, a track number, and a time code, the method comprising the steps of:

moving an optical head to a first track of the optical disk corresponding to a program start position;

moving said optical head from the first track to a second track, the second track being spaced from said first track by a predetermined number of said plurality of tracks;

reading the time code of said second track;

making only two comparisons between the read time code from the second track, a first preset value and a second preset value, the first preset value being lower than the second preset value; and controlling said optical disk unit to operate at a first rotating speed if the read time code is greater than the first preset value, at a second rotating speed if the read time code is less than the first preset value and greater than the second preset value, and at a third rotating speed if said read time code is less than said second preset value;

wherein the first rotating speed corresponds to a linear speed of the optical disk which is 1.2 m/s relative to the optical head, the second rotating speed corresponds to 1.3 m/s, and the third rotating speed corresponds to 1.4 m/s.

3. A method for adjusting a rotating speed of an optical disk mounted in an optical disk unit, the optical disk including a plurality of concentric tracks, each of the plurality of tracks including subcode Q information including an address, a track number, and a time code, the method comprising the steps of:

moving an optical head to a first track of the optical disk corresponding to a program start position;

moving said optical head from the first track to a second track, the second track being spaced from said first track by a predetermined radial distance along said optical disk;

reading the time code of said second track;

making only two comparisons between the read time code from the second track a first preset value and a second preset value, the first preset value being lower than the second preset value; and controlling said optical disk unit to operate at a first rotating speed if the read time code is greater than the first preset value, at a second rotating speed if the read time code is less than the first preset value and greater than the second preset value, and at a third rotating speed if said read time code is less than said second preset value;

wherein the first rotating speed corresponds to a linear speed of the optical disk which is 1.2 m/s relative to the optical head, the second rotating speed corresponds to 1.3 m/s, and the third rotating speed corresponds to 1.4 m/s.

* * * * *